United States Patent [19]
Plantz et al.

[11] Patent Number: 6,088,702
[45] Date of Patent: Jul. 11, 2000

[54] GROUP PUBLISHING SYSTEM

[76] Inventors: Scott H. Plantz, Suite 103 4450 Gulf Blvd., St. Pete Beach, Fla. 33706; Jeff Berezin, 206 Heleu St., N. Syracuse, N.Y. 13212

[21] Appl. No.: 09/030,107

[22] Filed: Feb. 25, 1998

[51] Int. Cl.⁷ .................................................. G06F 17/30
[52] U.S. Cl. ...................... 707/103; 707/104; 707/10; 707/9; 707/1; 707/513; 707/514; 707/906; 707/533; 345/329; 345/331
[58] Field of Search ............. 707/10, 1, 9, 906, 707/103, 104, 533, 514, 511; 345/329, 331

[56] References Cited

U.S. PATENT DOCUMENTS

| | | |
|---|---|---|
| 4,949,300 | 8/1990 | Christenson et al. . |
| 5,008,853 | 4/1991 | Bly et al. . |
| 5,014,267 | 5/1991 | Tompkins et al. ........................ 370/259 |
| 5,072,412 | 12/1991 | Henderson, Jr. et al. ................ 395/346 |
| 5,220,657 | 6/1993 | Bly et al. ................................ 711/152 |
| 5,245,553 | 9/1993 | Tanenbaum .............................. 364/514 |
| 5,247,615 | 9/1993 | Mori et al. ............................... 709/205 |
| 5,293,619 | 3/1994 | Dean ........................................ 709/302 |
| 5,339,389 | 8/1994 | Bates et al. .............................. 395/331 |
| 5,379,374 | 1/1995 | Ishizaki et al. .......................... 345/331 |
| 5,388,196 | 2/1995 | Pajak et al. .............................. 345/329 |
| 5,428,729 | 6/1995 | Chang et al. ............................ 345/331 |
| 5,446,842 | 8/1995 | Schaeffer et al. ....................... 709/205 |
| 5,471,318 | 11/1995 | Ahuja et al. ............................. 358/400 |
| 5,515,491 | 5/1996 | Bates et al. .............................. 395/331 |
| 5,608,872 | 3/1997 | Schwartz et al. ................... 395/200.04 |
| 5,617,539 | 4/1997 | Ludwig et al. .......................... 709/205 |
| 5,664,183 | 9/1997 | Cirulli et al. ............................ 707/103 |
| 5,758,079 | 5/1998 | Ludwig et al. .......................... 709/204 |
| 5,778,368 | 7/1998 | Hogan et al. ............................ 707/10 |
| 5,867,654 | 2/1999 | Ludwig et al. .......................... 709/204 |
| 5,907,324 | 5/1999 | Larson et al. ............................ 345/330 |
| 5,920,694 | 7/1999 | Carleton et al. ......................... 345/331 |
| 5,963,208 | 10/1999 | Dolan et al. ............................. 345/357 |
| 5,966,512 | 10/1999 | Bates et al. ......................... 395/200.35 |
| 5,978,817 | 11/1999 | Giannandrea et al. .................. 707/501 |
| 5,995,097 | 11/1999 | Tokumine et al. ...................... 345/331 |
| 6,005,568 | 12/1999 | Simonoff et al. ....................... 345/335 |
| 6,005,571 | 12/1999 | Pachauri .................................. 345/339 |

*Primary Examiner*—Hosain T. Alam
*Assistant Examiner*—Jean M. Corrielus
*Attorney, Agent, or Firm*—Joseph R. Englander; Mason & Assoc., P.A.

[57] ABSTRACT

The present invention is a Group Publishing System (GPS) for permitting coordinated publishing, assembly and administration of texts by an unlimited number of authors or editors, each of whom may perform word processing, document assembly and editing functions on the same or different portions of a group authored project. Each user of the system also has the capability of electronically communicating through the GPS with any other user of the system working on the same project. The word-processing functions of the GPS are standardized according to pre-defined formats, and e-mail communication links are provided for communication between all users. The system displays the assembled or partially assembled product to all users and operates in multi-media (text, video, CD-ROM, audio and photographic) formats. The output of the GPS is directly viewable, printable or downloadable in publishable format.

24 Claims, 11 Drawing Sheets

Microfiche Appendix Included
(1 Microfiche, 74 Pages)

100 (continued)

| 300 GAS ADMINISTRATIVE CONTROL CENTER |
|---|
| 301 Master Editor;<br>302 List E-Mail Address;<br>303 All Book/Project Topics and E-Mail Addresses of Assigned Authors/Editors;<br>304 Menu of Unassigned Topics;<br>305 Web Board Maintenance;<br>306 Delete Authors or other GAS Data;<br>307 List Project Progress;<br>308 List Unassigned Project Status;<br>309 Review Author Passwords & Assignments;<br>310 Review Editor Passwords & Assignments;<br>311 Author E-Mail and other Information;<br>312 Review Chapter Assignments;<br>313 Review GAS Usage Statistics;<br>314 E-Mail Broadcast;<br>315 Enter a new Author E-Mail;<br>316 Edit Author Information;<br>317 Editor Assignments;<br>318 Delete Topic;<br>319 Add Topic |

*Fig. 4*

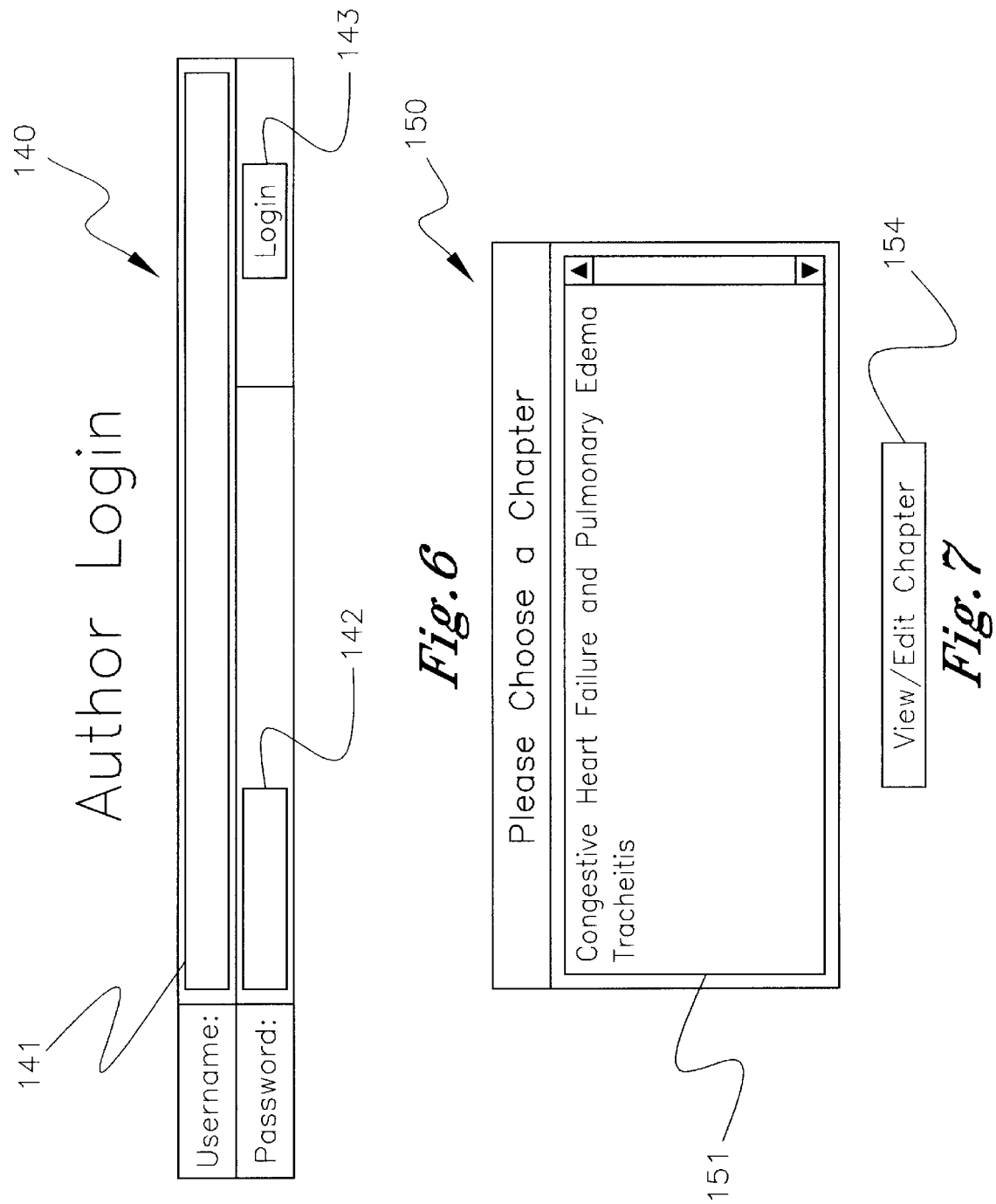

Group Authoring System

Please Choose a Chapter to Edit

Topics ready to be edited

```
Caustic Ingestions
Nonsteroidal Anti-inflammatory Agent Poisoning
Sedative-hypnotic Poisoning
Valproate Poisoning
```

[ View/Edit Chapter ]

Topics which you have previously approved.

[ None Found ]

Topics not yet ready to be edited

```
Digitalis Toxicity
Mercury poisoning
Methemoglobinemia
Phencyclidine Poisoning
Phenytoin Poisoning
Priupism
Rhabdomyolsis
Terpene Poisoning
Theophylline Poisoning
GSW - Forensic Aspects
Consent
Litigation Stress
Local Anesthetics and Toxicity
```

[ View/Edit Chapter ]

*Fig. 10*

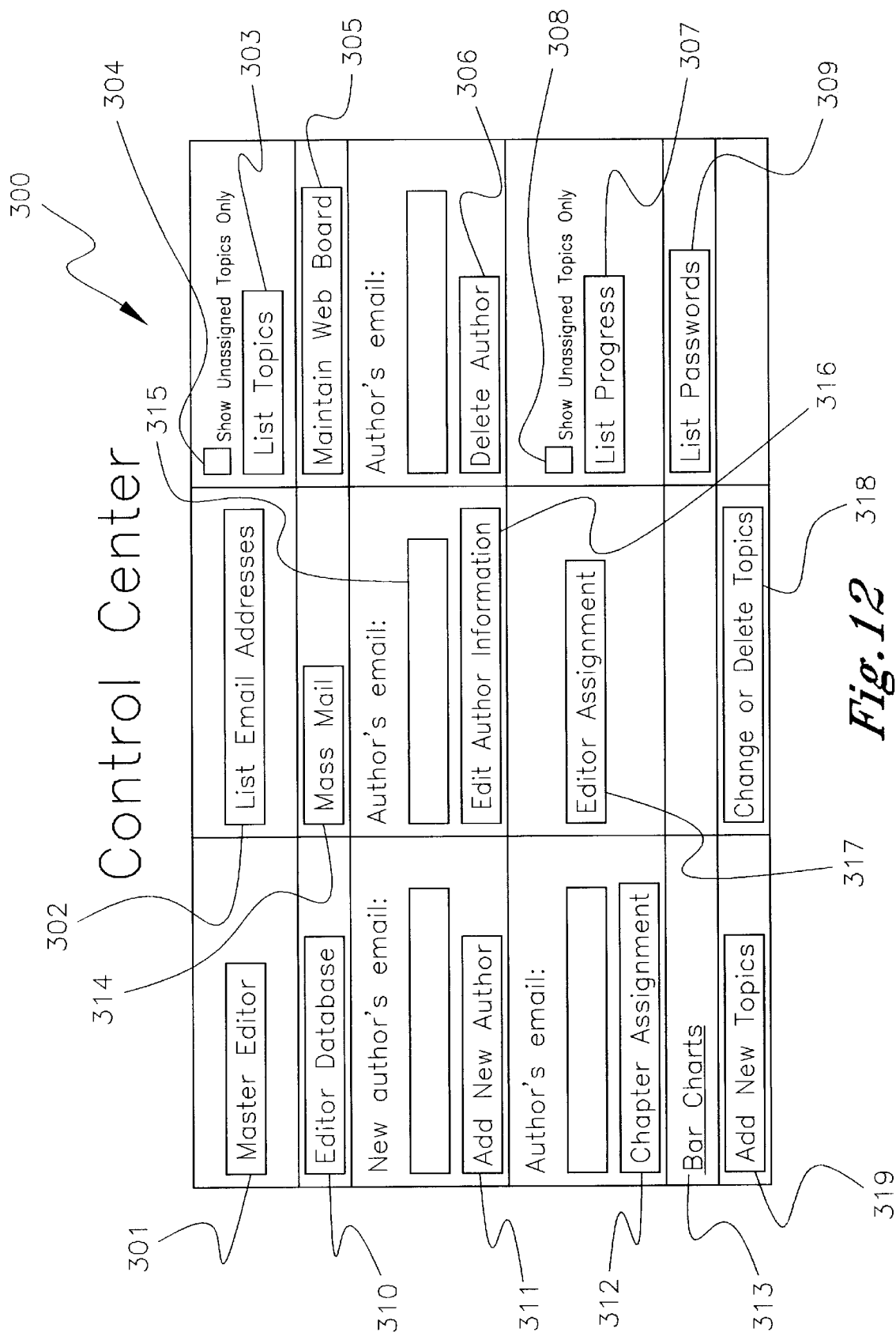

GROUP PUBLISHING SYSTEM

MICROFICHE APPENDIX REFERENCE

This application contains a microfiche appendix which is incorporated herein by reference. The microfiche appendix contains 1 microfiche and a total of 74 frames.

FIELD OF THE INVENTION

The present invention is a Group Publishing System (GPS) for permitting coordinated or simultaneous publishing, assembly and administration of texts by an unlimited number of authors or editors, each of whom may perform word processing, document assembly and editing functions on the same or different portions of a group authored project. Each user of the system also has the capability of communicating with any other user of the system working on the same project. The word-processing functions of the GPS are standardized according to pre-defined formats, and e-mail communication links are provided for communication between all users. The system displays the assembled or partially assembled product to all users and operates in multi-media (text, video, CD-ROM, audio and photographic) formats. The output of the GPS is directly viewable, printable or downloadable in publishable format.

BACKGROUND OF THE INVENTION

In recent years, the need for collaborative computing environments has received increasing attention. Especially in book publishing, it has been found to be very time consuming to share data, to have edited versions of hard-copy documents shared by mail, and to exchange electronic copies of documents that are frequently in incompatible digital formats or languages. It is increasingly necessary for editors and authors to share data and to consult with colleagues, who often may be from different occupational disciplines, and who may be located in geographically distant and sometimes even remote places around the world. Since, in general, people prefer to use the tools they employ in their daily work, an important part of any collaborative computing project would be to allow maximal use of currently existing tools with which the user community is already familiar.

Efforts known in the art attempting to achieve electronic collaboration between multiple users include the following:

In U.S. Pat. No. 4,479,195, (the '195 patent), a multi-user conferencing network that allows all users to share data was disclosed. Word processing and publishing was not mentioned. The program is set up in a hierarchical structure where all users use one and the same application program.

U.S. Pat. No. 4,949,300 (the '300 patent) details IBM's development of data control systems permitting a central processing unit and peripheral data processing units to share in the subroutines necessary for successful implementation of a word-processing program. The advance claimed in the patent (see especially column 3, lines 44–47) is the ability to more effectively utilize the processing power of personal computers, as opposed to "dumb terminals," when linked to a main computer which houses the data and programs for executing word-processing functions. While enhancements such as those contemplated by the '300 patent may be operational for control of data communications between central and peripheral data processors in commercially available hardware or software systems in which the present group publishing system is implemented, the '300 patent neither discloses nor suggests a means for systematic coordination of the various procedural steps required for successful management of the activities of individual authors and editors who contribute to a group publishing project, which is the basis of the present contribution.

In U.S. Pat. Nos. 5,008,853 and 5,220,657 (the '853 and '657 patents), a real-time, WYSIWIS ("what you see is what I see") system is described for manipulation of so-called "structured data objects," including multi-page documents, wherein each page linked to other pages in a predetermined order, is considered a "structured data object" (see column 1, line 65 to column 2, line 33). Specifically excluded from the types of "structured data objects" that may be employed according to the '853 and '657 patents are hierarchical texts, such as folders, record files, books, shared books themselves, and reference icons (see column 18, lines 43–59 of the '853 patent). As will be seen, the present group publishing system is not so limited. In addition, from column 19, lines 1–15 of the '853 patent, it appears that in order to author or edit any section of a shared data object, a copy of the section of the object must be downloaded from a file server to the particular user's desktop machine, modified, and then re-uploaded to the file server for integration into the shared data object. Accordingly, multiple copies of a given document, or sections thereof, may exist on many different computers at the same time (see column 28, lines 7–8 of the '853 patent). Although the referenced patent relates efforts to update all users as to current data, the fact remains that multiple copies of an existing document may exist at various locations at the same time. As will be seen, this is essentially the inverse of the present system, in which all data and modifications to a group-authored document are made by each user on a single existing document resident on a central computer, thereby avoiding the problem of multiple versions of a document on different computers at the same time. Further, it is noted that throughout, the locking of a document by a given user may be a user-specified function, as opposed to a system imposed function (see for example column 21, lines 24–56 of the '853 patent; however, see also column 23, lines 23–62, which seems to imply some level of automatic system lockup of documents). This raises the difficulty that when other authors or editors need to access a locked document, contact with the locking author may first be required (see column 27, lines 61–68). In addition, if an author or editor fails to lock a document they are working on, others may access unedited versions of the same document, thus causing confusion, loss of time and efficiency. As will be seen, in the instant system, access to a document or subsection thereof automatically prevents others from accessing the document or section until the first author or editor has completed work on that document or section. These and other differences will be apparent from a review of the complete disclosure of the present invention, which follows.

In U.S. Pat. No. 5,072,412, (the '412 patent), a windows-based system was disclosed wherein updating of workspace data structures on linked workspaces was disclosed. The output of the system is a transient display on various terminals. Accordingly, the system does not amount to a system in which a group authored product is produced, as in the present invention.

In U.S. Pat. No. 5,245,553, (the '553 patent), an interactive document generation system is described which allows multiple users to essentially instantaneously and concurrently view, edit and share data on linked computers. Requirements of the '553 patented system include that similar computers must be used, and that each computer must be controlled by similar computer programs (see column 4, lines 3–6). Unlike the present invention, the '553 patented system does not involve a central computer that stores data produced by a first user, and which makes the stored data available to other users at a time independent of the first user's input. Further, as will be noted from a review of the instant disclosure, one of the key advantages of the present system is that dissimilar computers may be used in the system, while the central computer software controls the document assembly process.

In U.S. Pat. No. 5,247,615 (the '615 patent), a system for interactive data processing is described wherein participation of a new member is controlled by a first communication, followed by acceptance by existing users, and thereafter, real-time co-processing of data which is transmitted in a ring-like path (each workstation has an upstream and a downstream workstation) from participant to participant. Each participant's machine is required to house similar software for the system to operate as described (see column 4, lines 6–8). Concurrent telephone contact between the participants appears to be critical to the operation of the described system (see column 4, lines 38–40). Details regarding the establishment and termination of the upstream and downstream links forms the basis of the patent. By contrast, the instant invention does not require independent telephone and data links, does not require real-time interaction between users, and does not require similar or identical software to reside on each user's computer.

In U.S. Pat. No. 5,379,374, (the '374 patent), a collaborative information processing system and workstation is described wherein multiple users "referencing an identical screen image through data communications" are able to modify documents in real time. The "electronic conversation" that results appears to require separate and concurrent telephonic communications between data processing participants (see column 4, lines 11–19). Each workstation involved in the system is equipped with an "X window system (a trade mark or the Massachusetts Institute of Technology) which is a window system of server/client model." (See column 4, line 67 to column 5, line 13). Accordingly, the '374 patent system requires specific software and hardware for operation. The essence of the '374 patent being the control of window modules required to be called up from a windows server, rather than with control means for collaborative document generation, as in the present invention.

In U.S. Pat. No. 5,293,619 (the '619 patent), a method and apparatus for collaborative use by a number of users of one or more application program(s) is disclosed, wherein a control program is interposed between the application program(s) and the plurality of users, such that existing application programs intended for single-users may be used by the multiple users, optionally located remotely from each other. By virtue of the control program, all users are simultaneously able to view the output of the application program (column 2, lines 7–11). The subject control program operates using a communication protocol, such as X Windows, in which the application program is treated as a client and the remote users are treated as servers (column 3, lines 35–50). In this way, the application program is "fooled" into operating as if the control program is a single client, whereas each user interacts with the control program as if it were a multi-user capable application program (column 4, lines 27–31; i.e. the control program is a multi-user adapter for a single-user application program). As one example of the way in which the control program of the patent may be used, a simultaneous, interactive editing session of a text document is proposed (column 6, lines 45–64). However, while potentially useful in implementing the communication protocols that may be needed to implement the present invention, the method of the '619 patent neither discloses nor suggests a system, such as that provided by the instant disclosure, by which the efforts of a group of authors may be managed to produce a coherent group-authored project.

In U.S. Pat. No. 5,446,842 (the '842 patent), an object-oriented collaboration system is disclosed wherein, in a real-time fashion, collaborating users of the system are able to concurrently work on a joint project. The '842 patent neither discloses nor suggests a document control system in which each user operates authors or edits a portion of a document which, in combination with similar contributions by other authors or editors, which are uploaded in a defined format structure to a central group authored project, results in the production of the group-authored work.

In U.S. Pat. No. 5,608,872, (the '872 patent), a system is disclosed for enabling multiple remote users to operate a single computer program, the visual output of which is viewable by all users, each of which is able to annotate the display. Each computer using the proprietary system is required to execute the same software (see column 3, lines 3–4). By contrast, the present invention displays modifications to a document only after the modified document is refreshed for display on a network or server computer. In addition, the '872 patented system requires a host computer to execute all application programs such as word processors, whereas in the present invention, an author or editor may perform all tasks on their own workstation prior to making contact with the server and uploading the new data to the group authored project. Furthermore, the '872 patent is principally concerned with a system by which remote users may interactively modify a document, rather than with a management system for controlling the various steps required to successfully implement a group-authored document.

U.S. Pat. No. 5,617,539 (the '539 patent), addresses itself to the bandwidth constraints that limit effective, contemporaneous multimedia conferencing between individuals located at distributed locations. The stated goal of the '539 patented system is to achieve real-time collaboration between such individuals such that synchronization of real-time video and audio with text, graphic and other asynchronous data occurs over a local area network (LAN), wide area network (WAN), and the like. Accordingly, the intent of the patented system is the enhancement of real-time communications, as opposed to centralized, sequential (or asynchronous) assembly of a group authored project by a plurality of distributed users.

As is apparent from a review of the above discussed existing systems, there has been an emphasis in the collaborative computing arts to achieve, as much as possible, a real-time synchrony between distributed users of a system to achieve immediate conferencing or project modification. By contrast, as will be appreciated from a review of the full disclosure herein, the present invention provides an improved system for achieving centralized, sequential (or asynchronous) assembly of a group authored project by a plurality of distributed users.

SUMMARY OF THE INVENTION

The present invention relates to a computer-based Group Publishing System (GPS) for enhancing collaboration between and among individuals who may be separated by distance and/or time. Principal among the goals of this invention is to facilitate, in a desktop computing environment, through the Internet or other networked computing environment, a jointly authored and edited project. Multiple users can simultaneously work on the same project.

It is therefore an object of the present invention to provide a joint information processing system that includes an unlimited number of terminals capable of facilitating the joining of a member in and withdrawal of a member from a joint publishing project.

Another object of the present invention is provide a joint information processing system, including an unlimited number of terminals through which the members of a joint project can be easily contacted by other members.

A further object of this invention is to provide a method to facilitate and expedite the process of book and text editing, wherein more than one author and more than one editor participate and contribute.

A further object of this invention is to provide a method to allow essentially simultaneous viewing of an entire in-process document, which easily can be downloaded for publication in a variety of formats, including but not limited to CD-ROM, hard-copy book, or on-line HTML format.

Further objects of this invention include the provision of:

An Internet-based word-processing and editing GPS for documents that allows updating of documents for all authorized users; that allows users of the GPS to use any word-processing software currently on the market; and that is HTML-based and allows audio and video to be embedded in the text itself.

A communications system that allows full use of and integration with any current Internet e-mail provider or other networked e-mail system and which has Internet e-mail or other networked e-mail communications built directly into the GPS.

An HTML-based word-processing system that allows instant downloading of text to existing pre-press formats, such as Quark or Pagemaker, and uploading of pictures, graphics, video or audio data in any format.

A word-processing system that allows imbedding, directly into the document, of any currently existing graphic formats, from either Internet or off-line sources.

A GPS that does not require any additional technical connections, such as special cables or phone lines (beyond standard Internet or other network connections).

A GPS that does not require the installation of additional software or distributed desktop computing systems, as the GPS operating on a central server permits input from existing word-processing, publication, and pictorial formats.

A product that accepts input of varied text formats, if necessary, into the group authored document or project.

A system that allows direct and updatable links to be imbedded within the document to international, federal, state, and private searchable databases.

A GPS which allows, upon completion of the document or project, searching of all texts for keywords.

Other objects and advantages of the GPS of this invention will become apparent from a review of the complete disclosure and the appended claims.

BRIEF DESCRIPTION OF THE DRAWINGS

FIG. 4 is an outline of the administrative control center accessible by the overall administrator of the GPS.

FIG. 6 is a screen shot of one embodiment of a screen that may be displayed upon selection to enter the GPS as an author.

FIG. 7 is a screen shot of one embodiment of the layout of a chapter selection screen available to an authorized author after login to the GPS.

FIG. 10 is a screen shot of one embodiment of the layout of a chapter selection screen available to an authorized editor after login to the GPS.

FIG. 12 is a screen shot of a one embodiment of a layout of the administrative control center accessible by the overall administrator of the GPS.

DETAILED DESCRIPTION OF THE PREFERRED EMBODIMENTS

Figure 1:
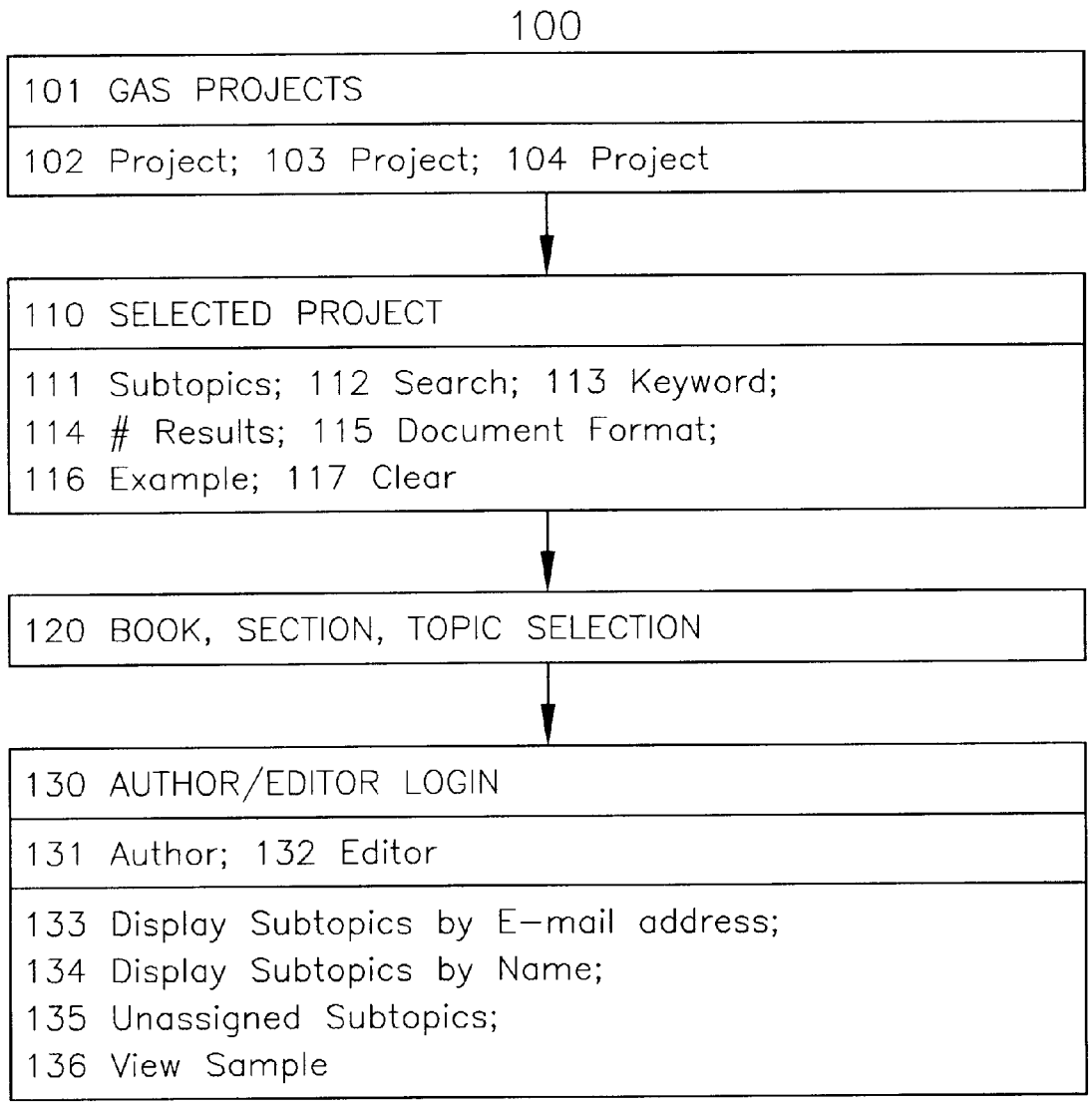
FIG. 1 is a flow diagram showing, in outline form, the initial steps and aspects of the present Group Publishing System (GPS) to achieve distributed author or editor login.
Figure 2:
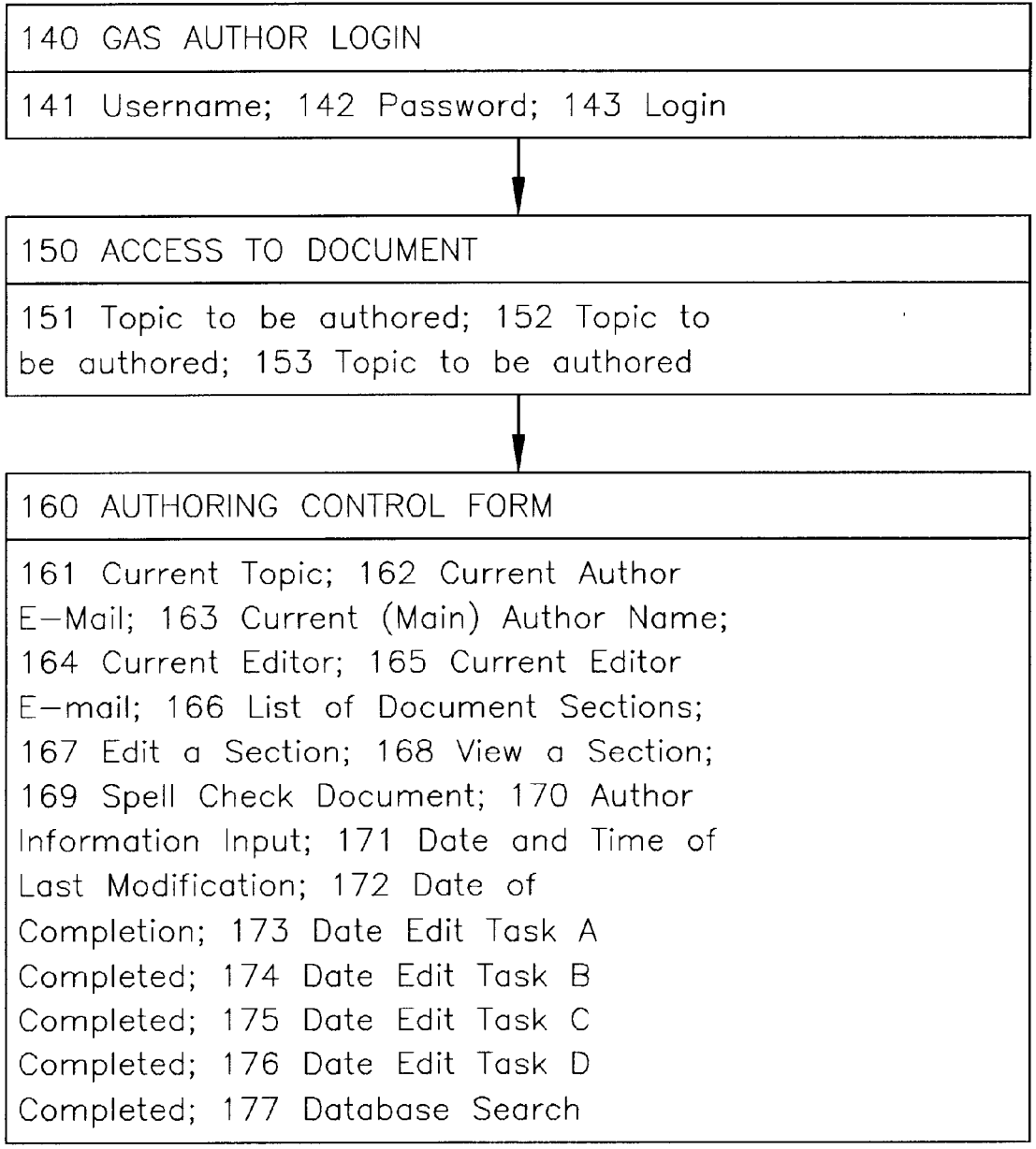
FIG. 2 is a flow diagram showing, in outline form, login by an author, access to a document stored on a central computer, and control of the tasks performed by an author who is authorized to utilize the GPS.
Figure 3:
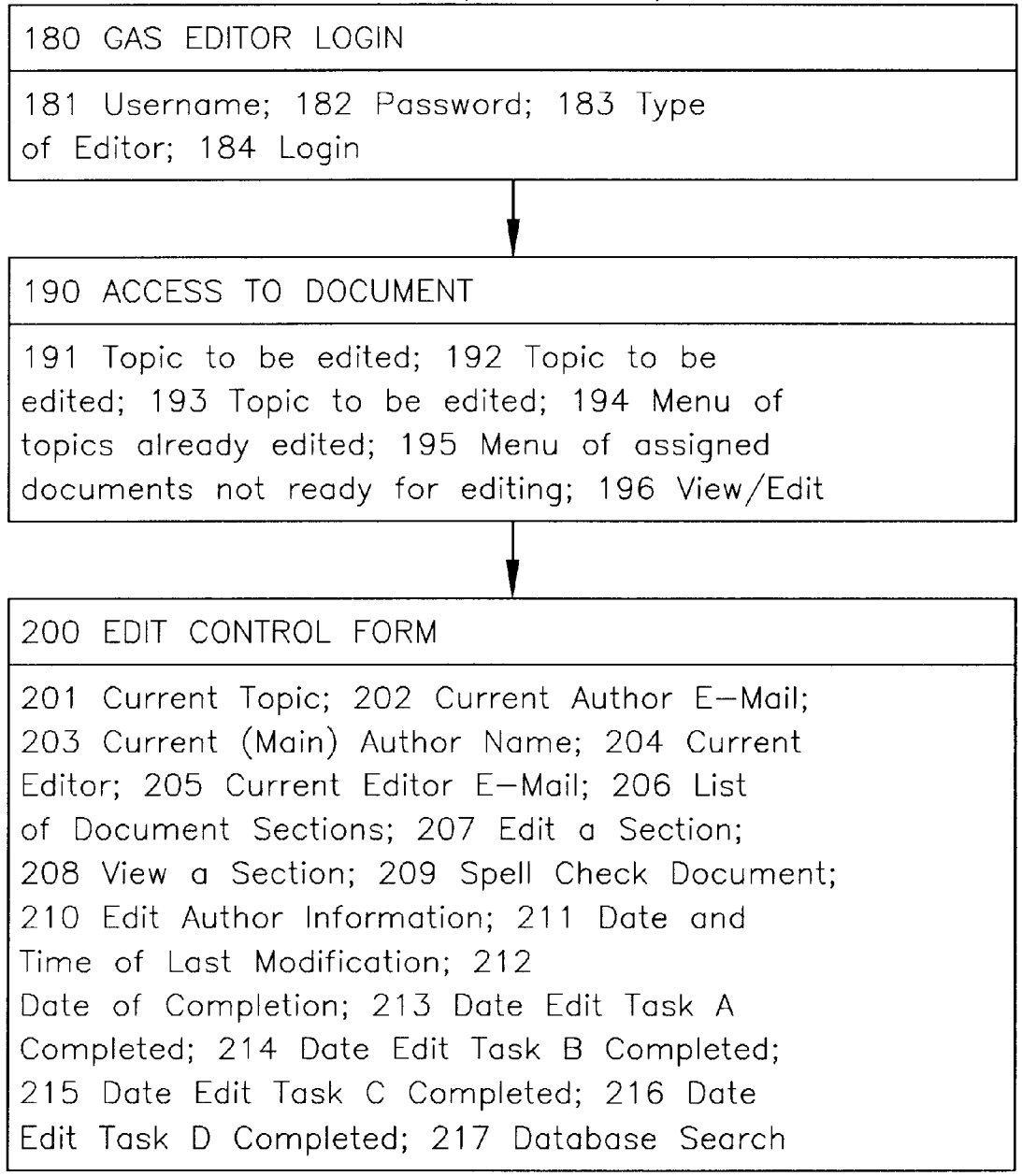
FIG. 3 is a flow diagram showing, in outline form, login by an editor, access to a document stored on a central computer, and control of the tasks performed by an editor who is authorized to utilize the GPS.

General features of the present invention may best be understood with reference to the figures, which explain in detail the collaborative environment provided by the Group Publishing System (GPS) of this invention. For purposes of logical disclosure of the GPS of this invention, publication projects are described as encompassing three key categories: (1) data storage and retrieval, (2) project management and (3) editing. The group authored product is referred to herein as the GPS project, a group authored project or document, or as a data object.

1. Data Storage and Retrieval:

A key requirement of the present GPS is that it provides support for efficiently finding, retrieving and storing the correct revisions of documents in process, even though multiple authors or editors may jointly be contributing to the assembly of the publication project, and even though these authors and editors may be geographically remote from each other. The GPS includes a means for tracking all document information, including but not limited to all information necessary to reproduce the document. In addition to document content, this information includes, but is not limited to, style and layout rules, spelling dictionaries and information obtained by following links and cross-references to other publications.

The GPS of this invention also safeguards data, despite computer or network failures or attempts by unauthorized users to modify the document. The current invention provides access control to prevent unauthorized persons from accessing and making changes to documents and projects.

2. Project Management:

The GPS of this invention offers support for organizing the production of documents. It assists with the layout of the document, with planning tasks and responsibilities, and with tracking the progress of work. In addition, through the e-mail links embedded at appropriate locations within the GPS, it is possible for any user of the GPS to contact any other participants on a project, without having to exit the GPS to use other applications. Furthermore, administration of the project assembly process, assignment of projects to authors and editors, and overall GPS maintenance by a GPS administrator is facilitated by an administration control center.

3. Editing:

Each system user has a computer, a display or monitor, and a means for entering data. To utilize the GPS of this invention a user connects to the Internet or other networked computing environment (such as a LAN, a WAN, a private dial-up billboard, and the like). Using any currently acceptable and available browser, including but not limited to Netscape Navigator, Internet Explorer, or the America On-line browser, the user links to the Uniform Resource Locator (URL) of the site on the Internet, or to the appropriate file on the server for another form of network, at which the GPS project is being hosted. The GPS of this invention is compatible with any computer, without requiring software changes to the user's software or hardware, thus allowing the viewing, editing and sharing of documents among users with a wide variety of individual computing environments.

A user of the GPS of this invention begins an editing session by accessing the gateway or top-level of the GPS URL, through which the user is permitted access to the document to be edited or authored. To prevent unauthorized access, the GPS requires each user to provide a username and a password to access the editing module of the system. Once an editing session is in progress, the system allows no other user to access the editing module for that document, or edited document segment, until the first user's editing session has ended. The GPS provides a control window, or interface, which allows the user to edit the document according to a style specified by the overall administrator of the GPS assembled project, to edit only a part of the document, or to select additional modules which facilitate uploading of other data, such as pictures, video, or audio. Text data is keyed directly into the system. Alternatively, data is entered via CUT and PASTE (clipboard) functions of word-processing software resident on the user's computer. Word processing functions to accept the cut and pasted documents and any embedded audio or video data are built into the GPS, making the GPS of the present invention compatible with any word-processing software currently available on the market, and with either Macintosh-compatible or IBM-compatible (Windows or Windows 95) computers. Therefore, the user of the GPS is able to author or edit GPS project documents using the software with which he or she is already familiar on their own desktop, and then to upload that data to the GPS project for assembly. Once the GPS editing or publishing session has been completed, viewing of the document is possible, as formatted and including such added data as pictures and video. Accordingly, it will be recognized that the GPS of this invention supports various types of data, including video and audio data, as well as various types and forms of graphics. Any non-text data is stored as part of the document itself, and is viewable upon incorporation into the GPS.

Referring now to FIG. 1, a flow diagram is provided which outlines the operation and features of the GPS 100 of this invention. A top level 101 of the system is accessed by linking to the uniform resource locator (URL) for the project to be authored or edited. As is by now well known in the art, the URL is an address for a unique file or set of files hosted on a particular server, linked to the Internet. The server is nothing more than a host computer which accepts access to data stored on the server, to which each such user is entitled to gain access. Means for controlling data access via username and password combinations, or like protection means, are well known in the art. It will be noted by those skilled in the art that the GPS of this invention need not be hosted on an Internet-linked server. Alternatively, the server may be accessible only to users via direct dialup, and in this event, the top level 101 of the GPS is merely the billboard provided for welcoming users to the private dialup server. In other embodiments of this invention, the GPS is operational over a Local Area Network (LAN), a Wide Area Network (WAN), or like networked environment, which may or may not require dialup, and which may operate over standard telephone lines, fiberoptic lines, ISDN connections or frame-relay connections.

From the top-level 101 of the GPS, users select from among a menu of document project(s) (102, 103, 104) to which that author or editor has previously received access authorization. The prior authorization to access a given project or document is arranged by any of a number of means acceptable both the contributing author or editor, and the overall manager of the GPS for the document being assembled. For example, in-person, telephonic, facsimile, standard mail, e-mail or like communication between the GPS project manager and the author or editor allows for convenient authorization of usernames and passwords.

Each project 102, 103, 104 displayed at the top-level of the GPS 101 is preferably a hyperlink to the particular project. As is well know in the art, hyperlinks are subroutines which permit the user to simply highlight or click on the desired link, and the appropriate behind-the scenes processing occurs such that the desired data is downloaded to the user's computer. Accordingly, selection and viewing of the document topics is achieved through the use of the mouse or like pointing and selection means known in the art. Upon selection of document topics to be viewed, a new display window 110 is displayed on the user's monitor. The user is provided with the options of: viewing documents by selection from a menu of subtopics 111, searching 112 the accessed database for keywords in desired documents. At this level, the user is able to enter keywords 113 for search according to Boolean or like search algorithms known in the art, and the user is able to specify how many documents should be retrieved 114 and whether an entire document, a complete file, or an extract thereof 115 is to be retrieved. Upon making the appropriate selections, the user then executes 116 or clears 117 the specified search.

Figure 5:
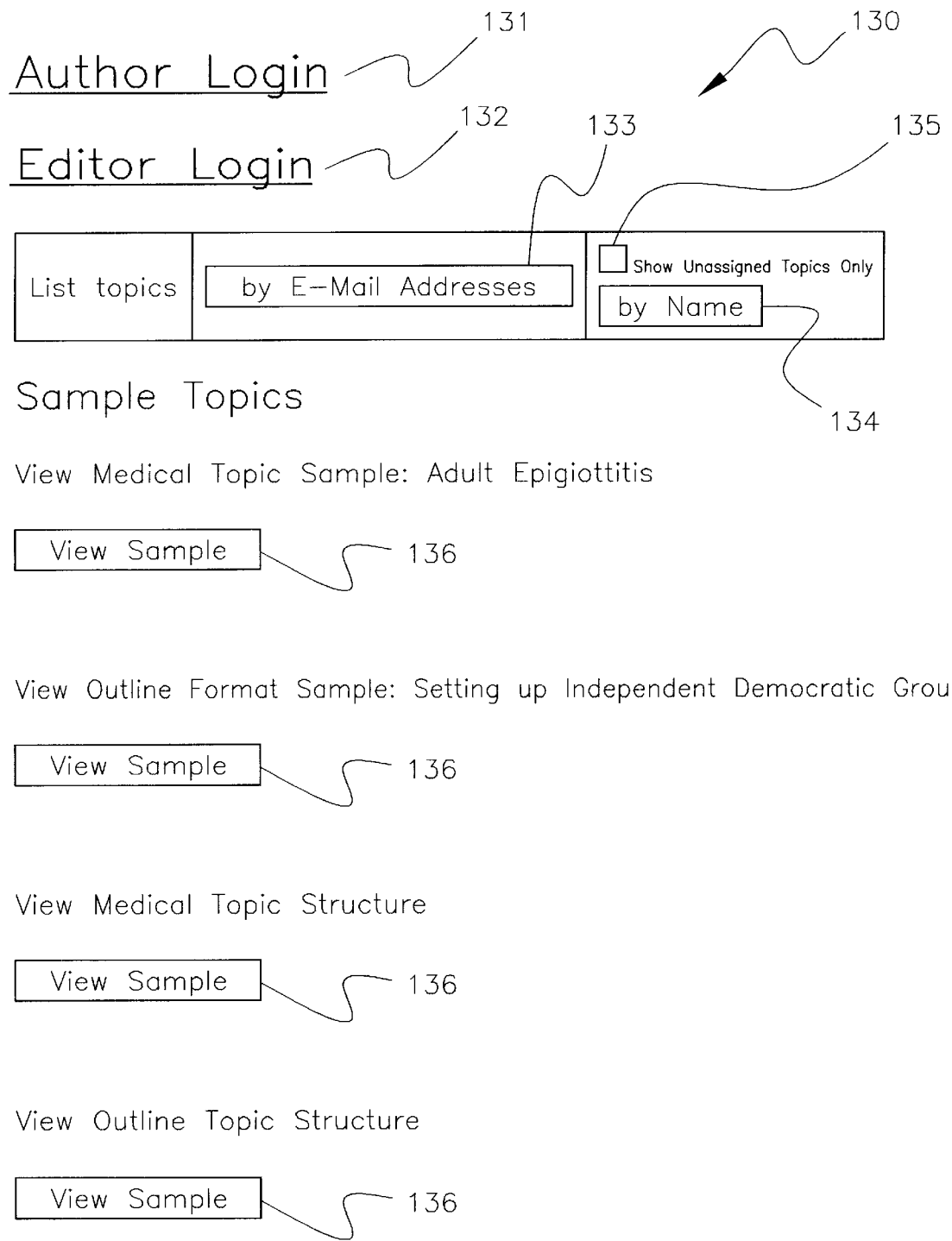
FIG. 5 is a screen shot of one embodiment of an author or editor login selection screen.

Once the appropriate subtopic has been selected 111 or a menu of search results is returned from execution of an appropriate search 116, the user who is an editor or author of a certain document selects 120 the section, subtopic or book on which he or she is working. Upon selection of the document, the user is prompted by an updated display 130 to select whether he/she is an author 131 or editor 132 of an already authored document. Because the author or editor may be authorized to work on multiple sections, subtopics or books, or because new authors or editors may need to determine whether there are books, topics, subtopics or sections of a group publishing project for which an assignment of author or editor has yet to be made, at this level, a display 133 of all available subtopics may be selected in order of the e-mail address of the author or editor assigned to the subtopic. Alternatively, a display according to subtopic name 134 may be selected, with an associated e-mail links to the assigned author(s) or editor(s) for the subtopic. In addition, the user may choose to have a display generated of all topics by name for which no author or editor has yet been assigned 135. In addition, to provide a guide of the format of the GPS project data, sample topics of documents are viewable by selection of a "View Sample" 136 option. To assist in visualization of the various aspects of this invention, screen shots of specific embodiments are provided wherein like numbered sections of the represented display are as described in FIGS. 1–4. Thus, in FIG. 5, one embodiment of this level of the GPS is shown. Those skilled in the art will recognize that alternate layouts of the disclosed elements of the GPS are contemplated by this invention.

The user next has the option of specifying whether they are an "author" 131 or an "editor" 132. Selection of the "author" option, 131, initiates a GPS subroutine calling for the authorized author to supply their username 141 and password 142 for author log-in 140, (see FIG. 6 for one embodiment of the layout for these functions). At this level, it is also possible for a new author to supply a username and password for acceptance of the new author as an expert, or by other criteria, for publishing of an unassigned topic. If a new author signs into the system, his or her name is added to a GPS database of usernames and passwords. Upon providing the required log-in data, a log-in selection 143 executes the log-in command, and if approved username and password data are supplied by the user, access to a menu of topics, subtopic, or chapters 151, 152, 153 for which the author is authorized to contribute is provided 150, along with a selection 154 to view or edit the selected document, (see FIG. 7 for one embodiment of the layout of these functions).

Figure 8:
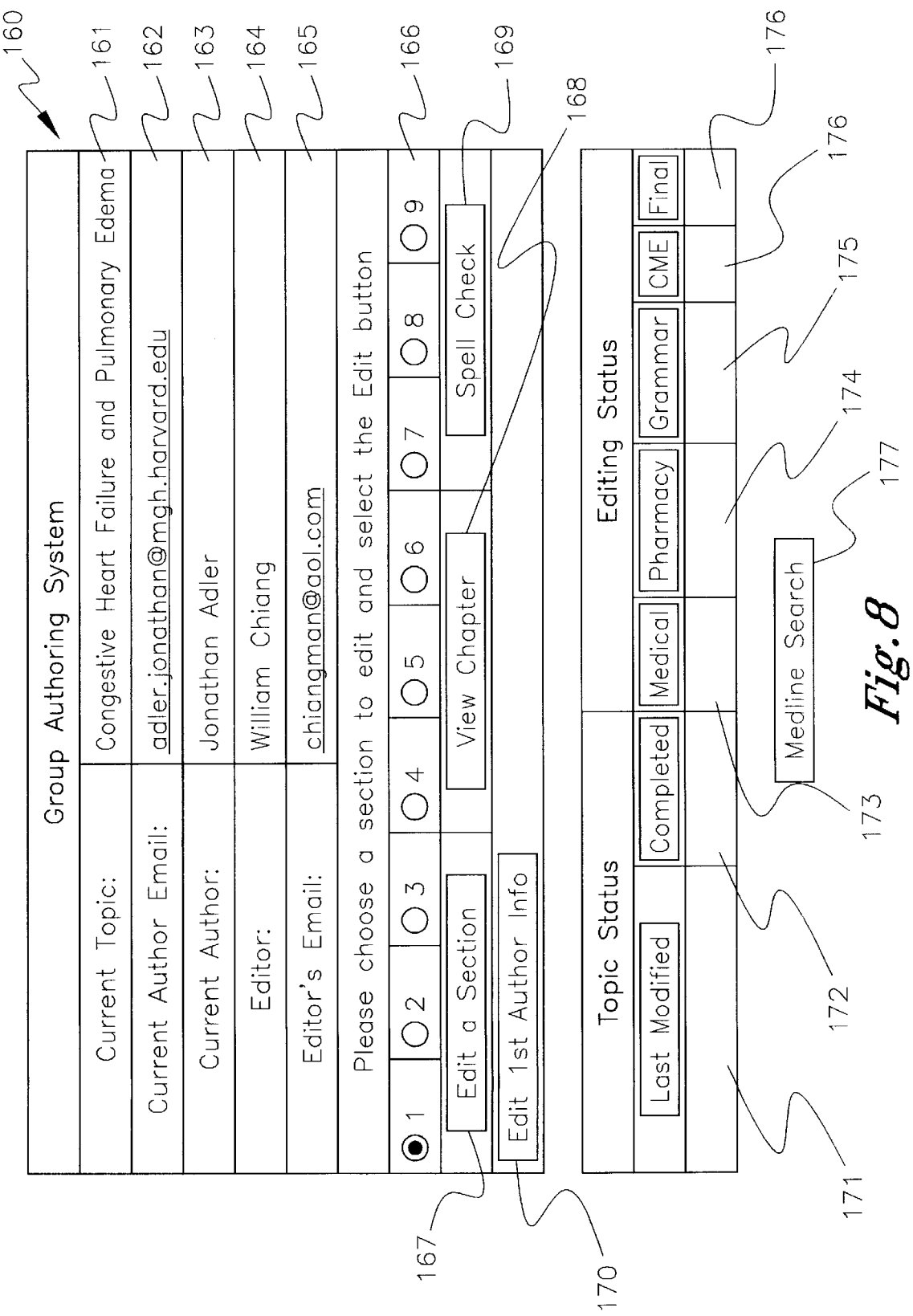
FIG. 8 is a screen shot of one embodiment of the layout for control of the tasks performed by an author who is authorized to utilize the GPS.

By selecting and highlighting the document 151, 152, 153 and selecting "View/Edit Document" 154, the GPS provides an publishing/editing control form 160 for the specific document. This form preferably comprises the following components: an indication of the current topic 161; an executable link to the current author's e-mail address 162; the name of the current or main author of the document 163; the name of the editor 164; an executable link to the assigned editor's e-mail address 165; a listing of the current document's subheadings or subsections for the author to select which document section is to be worked on 166; an option to "Edit a Section," 167 which, upon selection, executes the command and displays the selected document section to be edited; an option 168 to view the entire chapter in view-only mode; an option to "Spell Check" the selected section 169, selection of which opens the entire document for spell checking according to known algorithms; a selection 170 permitting the author to enter personal information such as their name, address, telephone number and similar data; 171 is a display of the date and time when the document was last modified; 172 displays the date on which the document was finally completed; 173, 174, 175, 176 are displays of the completion date of assigned aspects of the editing tasks associated with the document completion (for example, for a medically related document, these sections might include editorial signoffs by medical, pharmaceutical, grammatical and other experts, as well as signoff, for example, by an executive editor.; editorial titles, naturally, vary with the project); 177 provides a link to one or more particularly desirable databases or search engines (for example, for a medically related document, having a live link to a Medline Search engine at this point is preferred; see FIG. 8 for one embodiment of the layout of these GPS functions).

Figure 9:
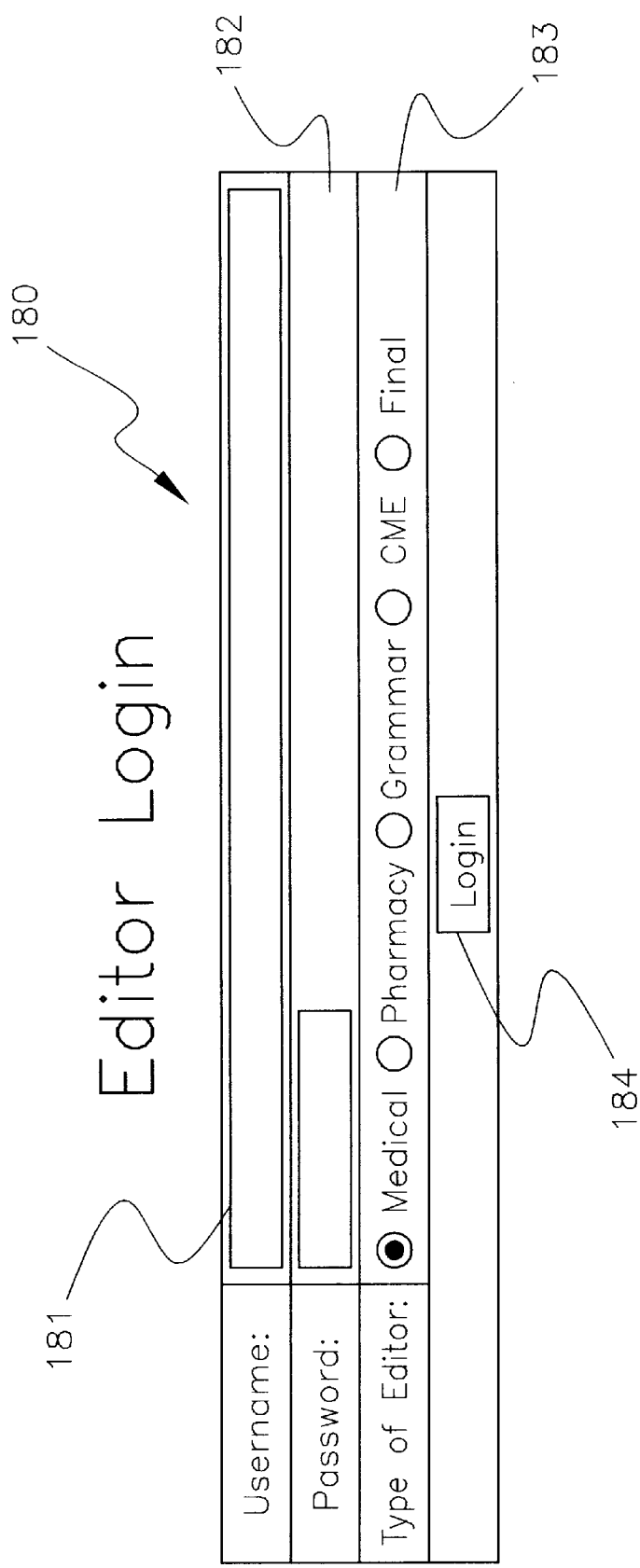
FIG. 9 is a screen shot of one embodiment of a screen that may be displayed upon selection to enter the GPS as an editor.

In a similar fashion to that described for author login, an editor logs-in upon performing the same initial steps up to the point where a selection of "author" 131 or "editor" 132 has to be made. Selection of the "editor" option 132, initiates a GPS subroutine 180 calling for the authorized editor to supply their username 181 and password 182. In addition, a selection 183 of the type of editor (e.g. medical, pharmaceutical, grammatical, etc.), is entered. At this level, it is also possible for a new editor to supply a username and password for acceptance of the new editor as an expert, or by other criteria, for editing of an unassigned editing topic or aspect. If a new editor signs into the system, his or her name is added to a GPS database of editor usernames and passwords, (see FIG. 9 for one embodiment of the layout for these functions). Upon providing the required log-in data, a log-in selection 184 executes the log-in command, and if approved username and password data are supplied by the user, access is provided to a menu 190 of topics, subtopics, or chapters 191, 192, 193 for which work by the authors is complete and which await editing. A menu 194 of topics that have already been edited by this editor and which are approved for further editing by other types of editors (e.g. by the grammar editors) is also preferably provided. A further menu 195 may be selected for topics that have been assigned to the editor but are not ready to be edited. The editor selects and highlights the desired topic and downloads that segment of the document by selecting 196, "View/Edit Chapter," (see FIG. 10 for one embodiment of the layout for these functions).

Figure 11:
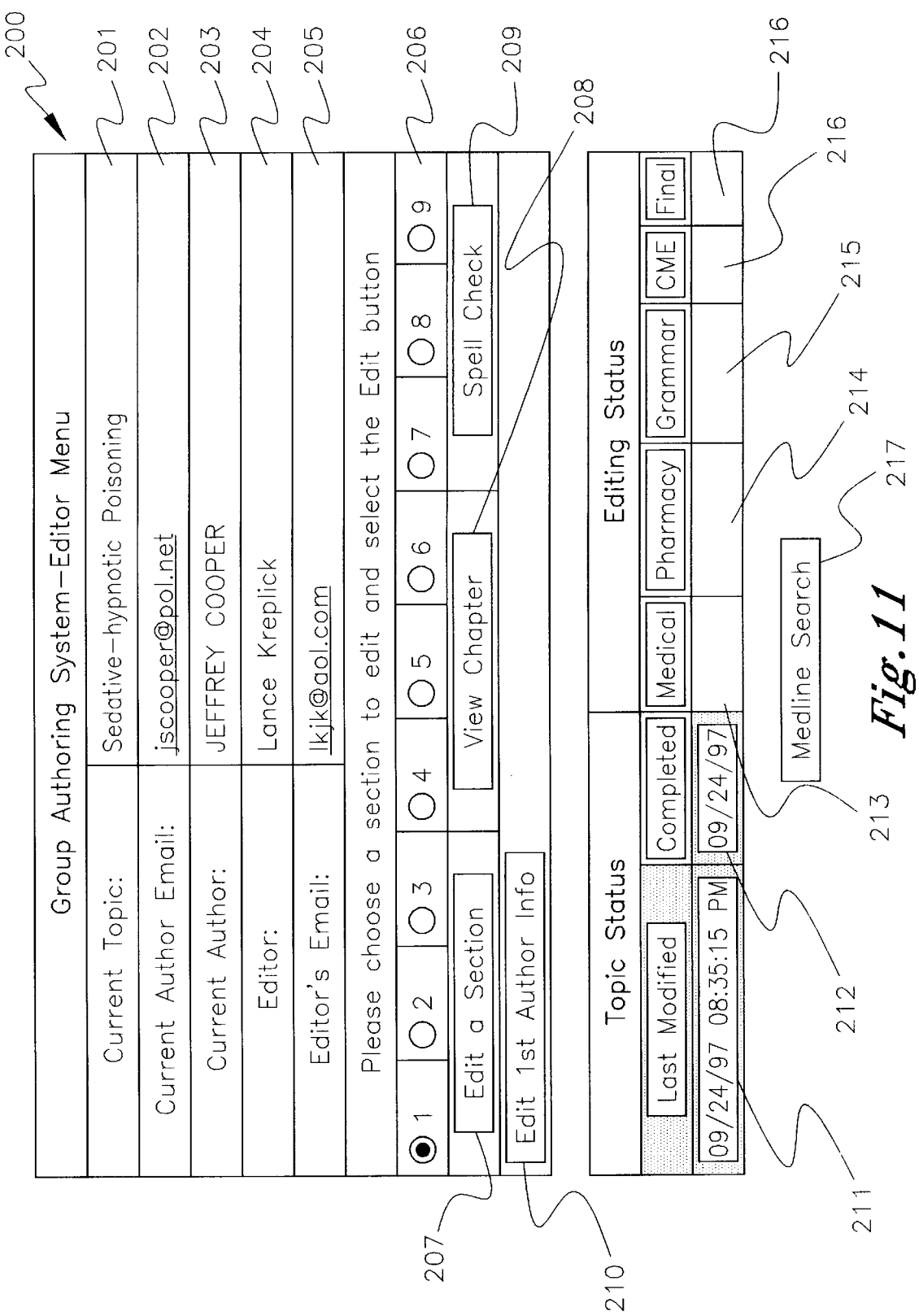
FIG. 11 is a screen shot of one embodiment of a layout for control of the tasks performed by an editor who is authorized to utilize the GPS.

In response to executing the "View/Edit Chapter" selection 196, the GPS displays the Edit Control Form 200 for the specific document. This form preferably comprises the following components: an indication of the current topic 201; an executable link to the current author's e-mail address 202; the name of the current or main author of the document 203; the name of the editor 204; an executable link to the assigned editor's e-mail address 205; a listing of the current document's subheadings or subsections for the editor to select which document section is to be worked on 206; an option to "Edit a Section," 207 which, upon selection, executes the command and displays the selected document section to be edited; an option 208 to view the entire chapter in view-only mode; an option to "Spell Check" the selected section 209, selection of which opens the entire document for spell checking according to known algorithms; a selection 210 permitting the editor to enter personal information such as their name, address, telephone number and similar data; 211 is a display of the date and time when the document was last modified; 212 displays the date on which the document was finally completed; 213, 214, 215, 216 are displays of the completion date of assigned aspects of the editing tasks associated with the document completion (for example, for a medically related document, these sections might include editorial signoffs by medical, pharmaceutical, grammatical and other experts, as well as signoff, for example, by an executive editor.; editorial titles, naturally, vary with the project); 217 provides a link to one or more particularly desirable databases or search engines (for example, for a medically related document, having a live link to a Medline Search engine at this point is preferred; see FIG. 11 for one embodiment of the layout for these functions).

The entire GPS is administered by a system administrator. As with editors or authors, as described above, the system administrator selects a book or project to review. However, by virtue of the administrator having been given administrative authority in the initial set-up of the GPS, upon selection of a book or project, the administrator invokes the GPS Administrative Control Center 300, preferably comprising at least the following components: 301 invokes a master editor for the document, permitting, for example, final administrative review of all edited aspects of the project; 302, "List e-mail address," allows the administrator to view the e-mail addresses of all participating authors and editors of that particular book or project; 303 invokes a menu of all book/project topics listed alphabetically with the corresponding e-mail addresses of the authors; 304 is a menu of all unassigned topics, allowing the administrator to view all project topics that have not been assigned to authors or editors; 305 maintain the web board, allows the administrator to modify any menus or selections available anywhere in the GPS, and posting of notes and messages to and from authors/editors involved in the project; 306 invokes a utility by which the administrator is able to delete any author's e-mail address or to delete any other information from GPS databases; 307 calls up a summary of the status of each available chapter within a project; 308 lists the progress of any aspects of the project to which authors or editors have yet to be assigned; 309 allows the administrator to review a list of the e-mail addresses of all current authors, as well as their assigned chapter topics and passwords; 310 allows the administrator to review a list of the e-mail addresses of all current editors, as well as their assigned chapter topics and passwords; 311 allows the e-mail address and other information of a new author to be entered, including physical addresses, phone numbers, and similar data; 312 allows the administrator to assign chapters to authors as well as review topics currently assigned to the author and topics that have not yet been assigned; 313 invokes statistical algorithms for tracking usage of the system; 314, as an option for the administrator, provides instant e-mail to all authors who are currently in the database for the specific topic; 315 enables the administrator to edit author information by providing the author's e-mail address and selecting "edit author information," 316; 317 facilitates editor assignment by invoking a display of all topics, as well as the names of all the editors assigned to that topic; 318 allows the administrator to change or delete any topic that is currently available in the topic database; 319 facilitates entrance of new topics to the GPS topic database.

In view of the foregoing disclosure, those skilled in the art will recognize that the system and method disclosed herein allows essentially simultaneous viewing of an entire in-process document, which easily can be downloaded for publication in a variety of formats, including but not limited to CD-ROM, hardcopy book, or on-line HTML format. Furthermore, the system permits assembly of HTML or text-based word-processing that allows instant downloading of text to existing pre-press formats, such as Quark or Pagemaker, and uploading of pictures, graphics, video or audio data in any format. In addition, it will be appreciated that the GPS of this invention allows, upon completion of the document or project, searching of all texts for keywords.

While it is believed that the foregoing disclosure fully enables those skilled in the art to make and use a group publishing system as disclosed herein, as an appendix hereto, there is provided a microfiche in which the object/source code for one embodiment of the GPS is provided. It should be recognized that independent copyright interests exist with respect to such code, and although no limitation is placed on copies being made of the present disclosure, all rights with respect to the copyrights in the appended code is explicitly reserved.

Those skilled in the art will recognize that, based on the instant disclosure, modifications and variations on the specifics provided herein may be made without departing from the scope of the invention as defined in the claims which follow.

What is claimed is:

1. A Group Publishing System (GPS) for asynchronous collaborative publishing and editing of a multimedia document project comprising text data, video data, audio data or combinations of these data forms, said GPS comprising:
    (a) a server hosting the GPS, to which a plurality of contributing authors or editors may link directly by personal computer upon receipt of authorization to link from a GPS administrator;
    (b) a project selection interface as a top level to which an authorized author or editor initially links upon linking to said GPS;
    (c) a login control center for verification of an author's authority to access a multimedia document project comprising one of text data, video data, audio data and combinations thereof, selected from said project selection interface;
    (d) an author control interface providing project status and control of author functions implemented by said author upon successful login to a selected project;
    (e) a login control center for verification of an editor's authority to access a multimedia document project comprising one of text data, video data, audio data and combinations thereof, selected from said project selection interface;
    (f) an editor control interface providing project status and control of editor functions implemented by said editor upon successful login to a selected project; and
    (g) an administrative control interface whereby overall administration of project selection for inclusion in the GPS, author and editor assignments, and project completion status is achieved.

2. The GPS of claim 1 wherein said GPS further comprises imbedded electronic mail links at each of the specified interfaces of said GPS to accommodate electronic communication between authors and editors assigned by said administrator to collaboration on a specified GPS project, and between said authors and editors and said administrator.

3. The GPS of claim 2 wherein said GPS is implemented on a LAN, a WAN or the Internet.

4. The GPS of claim 3 wherein said GPS is implemented on the Internet.

5. The GPS of claim 4 wherein said server hosting said GPS is accessed by each contributing author or editor by providing the uniform resource locator (URL) to a browser which then links to said server.

6. The GPS of claim 5, wherein said project selection interface comprises a hierarchical representation of project sections and subsections of a GPS project, each of which representations is a hyperlink to said section or said subsection of said GPS project, such that upon selection by an author or editor, said section or subsection is made available for modification to said author or editor, provided that said author or editor successfully is able to login to said GPS.

7. The GPS of claim 6 wherein said author or editor is required to specify whether login to said GPS is as an author or as an editor.

8. The GPS of claim 7 wherein said author or editor selects project topics or subtopics arranged according to the e-mail address of the assigned author, arranged by the topic or subtopic name, or arranged by unassigned topic or subtopic only.

9. The GPS of claim 5 wherein said login control center for verification of an author's authority to access a project selected from said project selection interface comprises a field for input by said author of said author's GPS system username, password, and an executable login command.

10. The GPS of claim 9 wherein said author control interface providing tracking of actions implemented by said author upon successful login to a selected project comprises input, executable or informational fields selected from the group consisting of current topic selection, executable current author e-mail, current author name, current editor name, executable current editor e-mail, a hypertext list of selected topic or subtopic document sections, executable edit selection, executable view (read-only) selection, executable spell check selection, author information input field, a representation of the date and time of the last modification to the selected GPS project section, a representation of the date of completion of the selected GPS project section, a representation of the date of completion of each of a plurality of section editing subtasks, an executable link to search an external database, and a combination of said input, executable or informational fields.

11. The GPS of claim 5 wherein said login control center for verification of an editor's authority to access a project selected from said project selection interface comprises a field for input by said editor of said editor's GPS system username, password, type of editor, and an executable login command.

12. The GPS of claim 11 wherein said editor control interface providing tracking of actions implemented by said editor upon successful login to a selected project comprises input, executable or informational fields selected from the group consisting of current topic selection, executable current author e-mail, current author name, current editor name, executable current editor e-mail, a hypertext list of selected topic or subtopic document sections, executable edit selection, executable view (read-only) selection, executable spell check selection, author information edit field, a representation of the date and time of the last modification to the selected GPS project section, a representation of the date of completion of the selected GPS project section, a representation of the date of completion of each of a plurality of section editing subtasks, an executable link to search an external database, and a combination of said input, executable or informational fields.

13. The GPS of claim 5 wherein said administrative control interface whereby overall administration of project selection for inclusion in the GPS, author and editor assignments, and project completion status is achieved comprises input, executable or informational fields selected from the group consisting of a master editor, a list of all author and editor e-mail addresses, a list of all GPS book or project topics including e-mail addresses of all assigned authors or editors, a list of all GPS projects to which authors or editors have yet to be assigned, a utilities to facilitate maintenance of all aspects of the URL, an executable means to permit deletion of authors or other GPS data, a list of project status, a list of all author passwords and project assignments, a list of all editor passwords and project assignments, a list of all author's e-mail addresses and other information, a list of chapter assignments, a statistical interface for tracking of GPS usage, an executable e-mail broadcast permitting e-mail of a given message to all GPS users, a means for entrance of new author e-mail, a means for author information editing, a means for editor assignment to GPS project sections, a means for topic deletion, a means for adding a new topic to the GPS, and a combination of said input, executable or informational fields.

14. A computer operating a Group Publishing System (GPS) for asynchronous collaborative publishing and editing of a multimedia document project comprising text data, video data, audio data or combinations of these data forms, said GPS comprising:

(a) a server hosting the GPS, to which a plurality of contributing authors or editors may link directly by personal computer upon receipt of authorization to link from a GPS administrator;

(b) a project selection interface as a top level to which an authorized author or editor initially links upon linking to said GPS;

(c) a login control center for verification of an author's authority to access a multimedia document project comprising one of text data, video data, audio data and combinations thereof, selected from said project selection interface;

(d) an author control interface providing project status and control of author functions implemented by said author upon successful login to a selected project;

(e) a login control center for verification of an editor's authority to access a multimedia document project comprising one of text data, video data, audio data and combinations thereof, selected from said project selection interface;

(f) an editor control interface providing project status and control of editor functions implemented by said editor upon successful login to a selected project; and (g) an administrative control interface whereby overall administration of project selection for inclusion in the GPS, author and editor assignments and project completion status is achieved.

15. A multimedia document comprising text data, audio data, video data and combinations of these forms of data, wherein said document is produced by or is part of a GPS, wherein said GPS is a Group Publishing system for asynchronous collaborative publishing and editing of a multimedia document project comprising text data, video data, audio data or combinations of these data forms, said C7PS comprising:

(a) a server hosting the GPS, to which a plurality of contributing authors or editors may link directly by personal computer upon receipt of authorization to link from a OPS administrator;

(b) a project selection interface as a top level to which an authorized author or editor initially links upon linking to said GPS;

(c) a login control center for verification of an author's authority to access a multimedia document project comprising one of text data, video data, audio data and combinations thereof, selected from said project selection interface;

(d) an author control interface providing project status and control of author functions implemented by said author upon successful login to a selected project;

(e) a login control center for verification of an editor's authority to access a multimedia document project comprising one of text data, video data, audio data and combinations thereof, selected from said project selection interface;

(f) an editor control interface providing project status and control of editor functions implemented by said editor upon successful login to a selected project; and (g) an administrative control interface whereby overall administration of project selection for inclusion in the GPS, author and editor assignments, and project completion status is achieved.

16. A method for achieving the sequential, consistent and controlled production of a multimedia document data object comprising text data, audio data, video data and combinations of such data, wherein said data is included in said data object by a plurality of authors or editors who, as a group and by virtue of their individual contributions of such data to said data object, create said data object, said method comprising implementation on a computer of a Group Publishing System (GPS) for asynchronous collaborative publishing and editing of a multimedia document project comprising text data, video data, audio data or combinations of these data forms, said GPS comprising;

(a) a server hosting the GPS, to which a plurality of contributing authors or editors may link directly by personal computer upon receipt of authorization to link from a CPS administrator;

(b) a project selection interface as a top level to which an authorized author or editor initially links upon linking to said GPS;

(c) a login control center for verification of an author's authority to access a multimedia document project comprising one of text data, video data, audio data and combinations thereof, selected from said project selection interface;

(d) an author control interface providing project status and control of author functions implemented by said author upon successful login to a selected project;

(e) a login control center for verification of an editor's authority to access a multimedia document project comprising one of text data, video data, audio data and combinations thereof, selected from said project selection interface;

(f) an editor control interface providing protect status and control of editor functions implemented by said editor upon successful login to a selected project; and (g) an administrative control interface whereby overall administration of project selection for inclusion in the GPS, author and editor assignments, and project completion status is achieved;

such that each author or editor contributing to said data object links to said GPS, downloads text data, audio data, video data or combinations of such data into the GPS residing on said server in an ordered and trackable fashion specified according to the structure defined by said GPS.

17. The method of claim 16 wherein each author or editor is able to utilize data processing means with which they are familiar to produce portions of the data object which they intend to submit for inclusion by the GPS, and then, upon linking to said GPS, cut and paste said portions of said data object into the appropriate location within said data object.

18. The method of claim 17 wherein each portion of said data object to which a first author or editor is linked becomes inaccessible to any other author or editor for so long as said first author or editor remains linked to said portion of said data object.

19. A Group Publishing System (CPS) for asynchronous collaborative publishing and editing of a multimedia document project comprising text data, video data, audio data or combinations of these data forms, said GPS comprising:

(a) a server hosting the GPS, to which a plurality of contributing authors or editors may link directly by personal computer upon receipt of authorization to link from a GPS administrator;

(b) a project selection interface as a top level to which an authorized author or editor initially links upon linking to said GPS, the project selection interface including a hierarchical representation of project sections and subsections of a GPS multimedia document project, each of which representations is a hyperlink to said section or said subsection of said GPS project, such that upon selection by the author or editor, said section or subsection is made available for modification to said author or editor, provided that said author or editor successfully is able to login to said GPS;

(c) a login control center for verification of an author's authority to access a multimedia document project comprising one of text data, video data, audio data and combinations thereof, selected from said project selection interface;

(d) an author control interface providing project status and control of author functions implemented by said author upon successful login to a selected project;

(e) a login control center for verification of an editor's authority to access a multimedia document project comprising one of text data, video data, audio data and combinations thereof, selected from said project selection interface;

(f) an editor control interface providing project status and control of editor functions implemented by said editor upon successful login to a selected project;

(g) an administrative control interface whereby overall administration of project selection for inclusion in the GPS, author and editor assignments, and project completion status is achieved; and (h) the GPS further including imbedded electronic mail links at each of the specified interfaces of said GPS to accommodate electronic communication between authors and editors assigned by said administrator to collaboration on a specified GPS project, and between said authors and editors and said administrator, wherein said GPS is implemented on the Internet, and wherein said server hosting said GPS is accessed by each: contributing author or editor by providing the uniform resource locator (URL) to a browser which then links to said server.

20. The GPS of claim 19, wherein said author or editor is required to specify whether login to said GPS is as an author or as an editor.

21. The GPS of claim 20 wherein said author or editor selects project topics or subtopics arranged according to the e-mail address of the assigned author, arranged by the topic or subtopic name, or arranged by unassigned topic or subtopic only.

22. A Group Publishing System (GPS) for asynchronous collaborative publishing and editing of a multimedia document project comprising text data, video data, audio data or combinations of these data forms, said GPS comprising:

(a) a server hosting the CPS, to which a plurality of contributing authors or editors may link directly by personal computer upon receipt of authorization to link from a GPS administrator;

(b) a project selection interface as a top level to which an authorized author or editor initially links upon linking to said GPS;

(c) a login control center for verification of an author's authority to access a multimedia document project comprising one of text data, video data, audio data and combinations thereof, selected from said project selection interface, the login control center including a field for input by the author of the author's GPS system username, password, and an executable login command;

(d) an author control interface providing project status and control of author functions implemented by said author upon successful login to a selected project, the author control interface including input, executable or informational fields selected from the group consisting of current topic selection, executable current author e-mail, current author name, current editor name, executable current editor e-mail, a hypertext list of selected topic or subtopic document sections, executable edit selection, executable view (read-only) selection, executable spell check selection, author information input field, a representation of the date and time of the last modification to the selected GPS project section, a representation of the date of completion of the selected GPS project section, a representation of the date of completion of each of a plurality of section editing subtasks, an executable link to search an external database, and a combination of said input, executable or informational fields;

(e) a login control center for verification of an editor's authority to access a multimedia document project comprising one of text data, video data, audio data and combinations thereof, selected from said project selection interface;

(f) an editor control interface providing project status and-control of editor functions implemented by said editor upon successful login to a selected project;

(g) an administrative control interface whereby overall administration of project selection for inclusion in the GPS, author and editor assignments, and project completion status is achieved; and (h) the GPS further including imbedded electronic mail links at each of the specified interfaces of said GPS to accommodate electronic communication between authors and editors assigned by said administrator to collaboration on a specified GPS project, and between said authors and editors and said administrator, wherein said GPS is implemented on the Internet, and wherein said server hosting said GPS is accessed by each contributing author or editor by providing the uniform resource locator (URL) to a browser which then links to said server.

23. A Group Publishing System (GPS) for asynchronous collaborative publishing and editing of a multimedia document project comprising text data, video data, audio data or combinations of these data forms, said GPS comprising:

(a) a server hosting the GPS, to which a plurality of contributing authors or editors may link directly by personal computer upon receipt of authorization to link from a GPS administrator;

(b) a project selection interface as a top level to which an authorized author or editor initially links upon linking to said GPS;

(c) a login control center for verification of an author's authority to access a multimedia document project comprising one of text data, video data, audio data and combinations thereof, selected from said project selection interface, the login control center further including a field for input by said editor of said editor's GPS system username, password, type of editor, and an executable login command;

(d) an author control interface providing project status and control of author functions implemented by said author upon successful login to a selected project;

(e) a login control center for verification of an editor's authority to access a multimedia document project comprising one of text data, video data, audio data and combinations thereof, selected from said project selection interface;

(f) an editor control interface providing project status and control of editor functions implemented by said editor upon successful login to a selected project, the editor control interface further including input, executable or informational fields selected from the group consisting of current topic selection, executable current author e-mail, current author name, current editor name, executable current editor e-mail, a hypertext list of selected topic or subtopic document sections, executable edit selection, executable view (read-only) selection, executable spell check selection, author information edit field, a representation of the date and time of the last modification to the selected GPS project section, a representation of the date of completion of the selected GPS project section, a representation of the date of completion of each of a plurality of section editing subtasks, an executable link to search an external database, and a combination of said input, executable or informational fields;

(g) an administrative control interface whereby overall administration of project selection for inclusion in the GPS, author and editor assignments, and project completion status is achieved;

(h) the CPS further comprising imbedded electronic mail links at each of the specified interfaces of said GPS to accommodate electronic communication between authors and editors assigned by said administrator to collaboration on a specified GPS project, and between said authors and editors and said administrator, wherein said GPS is implemented on the Internet, and wherein said server hosting said CPS is accessed by each contributing author or editor by providing the uniform resource locator (URL) to a browser which then links to said server.

24. A Group Publishing system (GPS) for asynchronous collaborative publishing and editing of a multimedia document project comprising text data, video data, audio data or combinations of these data forms, said GPS comprising:

(a) a server hosting the GPS, to which a plurality of contributing authors or editors may link directly by personal computer upon receipt of authorization to link from a GPS administrator;

(b) a project selection interface as a top level to which an authorized author or editor initially links upon linking to said GPS;

(c) a login control center for verification of an author's authority to access a multimedia document project comprising one of text data, video data, audio data and combinations thereof, selected from said project selection interface;

(d) an author control interface providing project status and control of author functions implemented by said author upon successful login to a selected project;

(e) a login control center for verification of an editor's authority to access a multimedia document project comprising one of text data, video data, audio data and combinations thereof, selected from said project selection interface;

(f) an editor control interface providing project status and control of editor functions implemented by said editor upon successful login to a selected project;

(g) an administrative control interface whereby overall administration of project selection for inclusion in the GPS, author and editor assignments, and project completion status is achieved, the administrative control interface further including input, executable or informational fields selected from the group consisting of a master editor, a list of all author and editor e-mail addresses, a list of all CPS book or project topics including e-mail addresses of all assigned authors or editors, a list of all GPS projects to which authors or editors have yet to be assigned, a utilities to facilitate maintenance of all aspects of the URL, an executable means to permit deletion of authors or other GPS data, a list of project status, a list of all author passwords and project assignments, a list of all editor passwords and project assignments, a list of all author's e-mail addresses and other information, a list of chapter assignments, a statistical interface for tracking of GPS usage, an executable e-mail broadcast permitting email of a given message to all GPS users, a means for entrance of new author e-mail, a means for author information editing, a means for editor assignment to GPS project sections, a means for topic deletion, a means for adding a new topic to the GPS, and a combination of said input, executable or informational fields; and (h) the GPS further including imbedded electronic mail links at each of the specified interfaces of said GPS to accommodate electronic communication between authors and editors assigned by said administrator to collaboration on a specified GPS project, and between said authors and editors and said administrator, wherein said GPS is implemented on the Internet, and wherein said server hosting said GPS is accessed by each contributing author or editor by providing the uniform resource locator (URL) to a browser which then links to said server.

* * * * *